United States Patent [19]
Lerner

[11] 3,728,648
[45] Apr. 17, 1973

[54] POWER DISTRIBUTION NETWORK

[75] Inventor: David S. Lerner, Fanwood, N.J.

[73] Assignee: Lockheed Electronics Company, Inc., Plainfield, N.J.

[22] Filed: June 28, 1971

[21] Appl. No.: 157,222

[52] U.S. Cl.........................333/6, 333/10, 333/21 R, 343/100 SA, 343/854
[51] Int. Cl................................................H01p 5/12
[58] Field of Search..........................333/6, 10, 21 R; 343/853, 854, 16 M, 100 SA

[56] References Cited

UNITED STATES PATENTS 3,165,743 1/1965 Hatkin..........................343/854 UX
3,587,004 6/1971 Parad....................................333/10

*Primary Examiner*—Paul L. Gensler
*Attorney*—George C. Sullivan

[57] ABSTRACT

A power distribution and control network wherein two crossed $TE_{11}$ modes and a TEM mode are derived and then combined in a radial transmission line. The relative amplitudes and phases are adjusted to yield a "-cosine-on-a-pedestal" amplitude distribution. Then, preserving phase of the two $TE_{11}$ modes, the pair is shifted in amplitude with respect to the TEM mode, and the "cosine-on-a-pedestal" distribution is made to rotate. The resulting signal is applied to the radiators of a phased array.

5 Claims, 7 Drawing Figures

DAVID S. LERNER
*INVENTOR.*

BY George Sullivan
Agent

DAVID S. LERNER
*INVENTOR.*

*BY* George O'Sullivan
Agent

POWER DISTRIBUTION NETWORK

The present invention relates to a device for providing a varied amplitude signal to the radiator of a phased array, and more particularly to a control network and power distribution network for producing the signal.

Prior art systems for scanning an array have generally been mechanical or electronic. In mechanically scanned systems, the rotation of the amplitude distribution is accomplished by means of an rf commutator. For electronically scanned arrays, complex diode switching matrices (having hundreds of diodes) to accomplish the same function have been described by others. See R. J. Giannini, "An Electronically-Scanned Cylindrical Array Based on a Switching and Phasing Technique," IRSI/G-AP Symposium Digest, 1969; G. Sheleg, "Matrix Fed Circular Array for Continuous Scanning," IEEE, 1968, G-AP International Symposium Program and Digest, 1968.

The primary object of the invention is to provide a simplified scanning system at relatively low cost.

Another object of the invention is to provide a scanning system having low insertion loss.

A further object of the invention is to provide a scanning system which is simple to control.

These and other objects of the invention will become apparent from the following description when taken with the accompanying drawings, in which.

Figure 1:
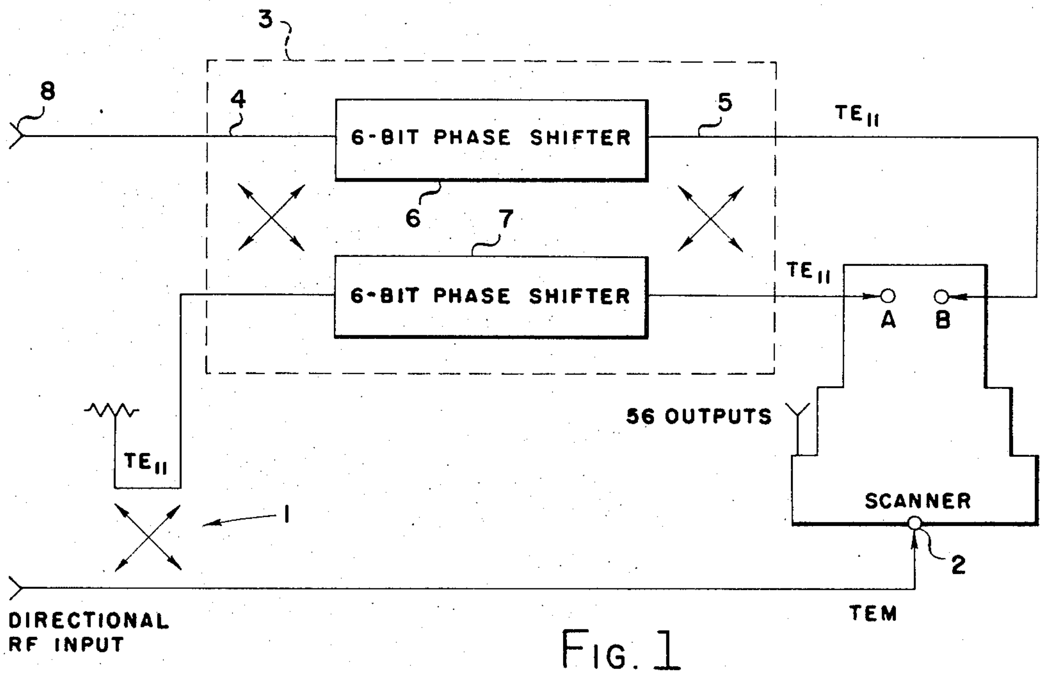
FIG. 1 is a block diagram of the control network and the power distribution network (or scanner)
Figure 2:
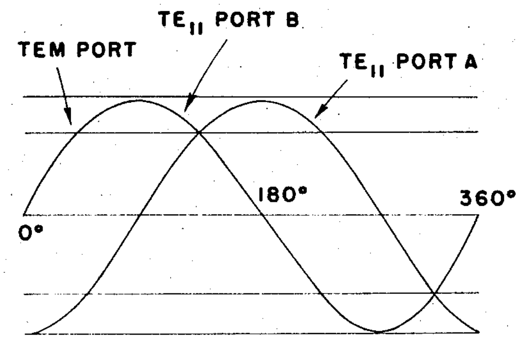
FIGS. 2 and 3 illustrate waveforms which are involved and will help to explain the invention.

Now referring to FIG. 1, the directional rf input is applied to directional coupler 1. The through arm of the coupler delivers power as a TEM mode of constant amplitude to input 2 of the scanner, while the coupled arm delivers power over a $TE_{11}$ path to the control network 3. The control network integrates two 3-dB couplers 4 and 5 and two 6-bit phase shifters 6 and 7. Couplers 4 and 5 are identical 3-dB branch-line couplers. The two phase shifters are operated so that they introduce equal and opposite phase shifts. The output amplitudes to the $TE_{11}$ ports A and B of the scanner can be shown to be a cosine and sine function of the phase shift in the 6-bit phase shifters as depicted in FIG. 2. The output phase to the $TE_{11}$ ports A and B of the scanner can be shown to be equal and independent of the equal and opposite phase shift in the 6-bit phase shifters.

Coupler 1 determines the amplitude taper in the directional mode by proportioning the constant and cosine terms of the distribution. With equal losses in both paths, an 8.9-dB coupler would be required to provide the necessary taper. However, the actual coupler value is more nearly 6dB because of the higher losses in the $TE_{11}$ path. It should be noted that the bulk of the power is in the low-loss TEM path. This results in an overall insertion loss of about 1dB for the scanner and control network. Branch line directional couplers are known; for example, see "Directional Couplers" by Montgomery et al. in "Principles of Microwave Circuits," McGraw-Hill, 1948, pages 299 and 451.

The 6-bit phase shifters are of a standard digital type, employing diode-terminated, 3-dB couplers in the 180° and 90° bits and using loaded lines to obtain the 45°, 22.5°, 11.25° and 5.625° bits. See J. F. White, "High Power, p-i-n Diode Controlled, Microwave Transmission Phase Shifters," IEEE Transactions on Microwave Theory and Techniques, March 1965, pages 233–262. The direct relation between the phase shifter setting and the position of the output distribution allows the digital control of an input command word with no computation or data conversion.

The directional couplers and phase shifters in the $TE_{11}$ path operate to produce two outputs, the amplitude of which are proportional to the sine and cosine of the equal and opposite phase shifts.

Figure 4:
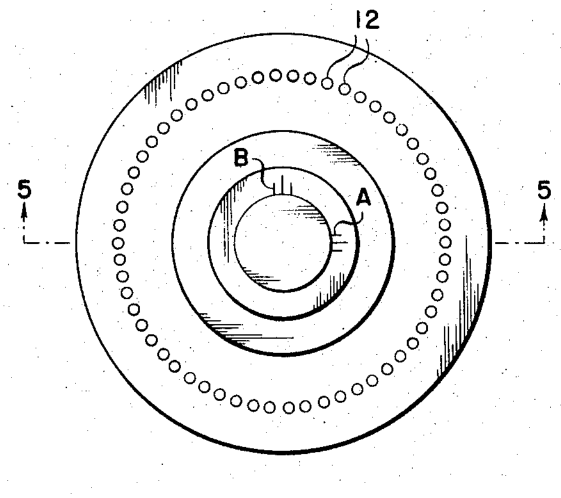
FIG. 4 is a plan view of an embodiment of a distribution network, or scanner.
Figure 6:
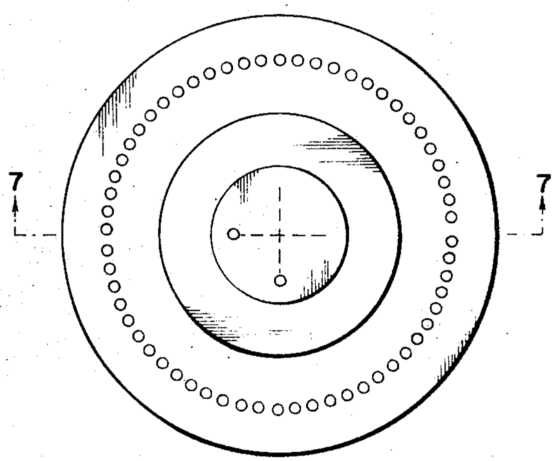
FIG. 6 is a plan view of a second embodiment of a scanner.
Figure 5:
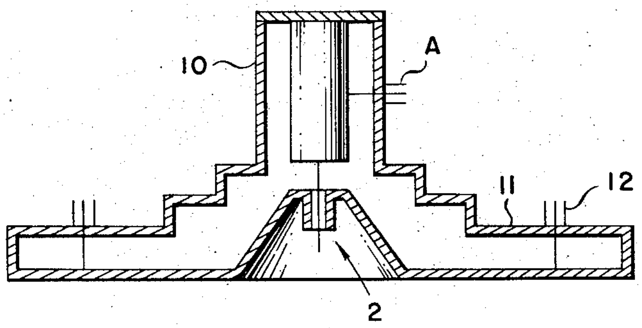
FIG. 5 is a cross section of FIG. 4 taken on the line 5—5.
Figure 7:
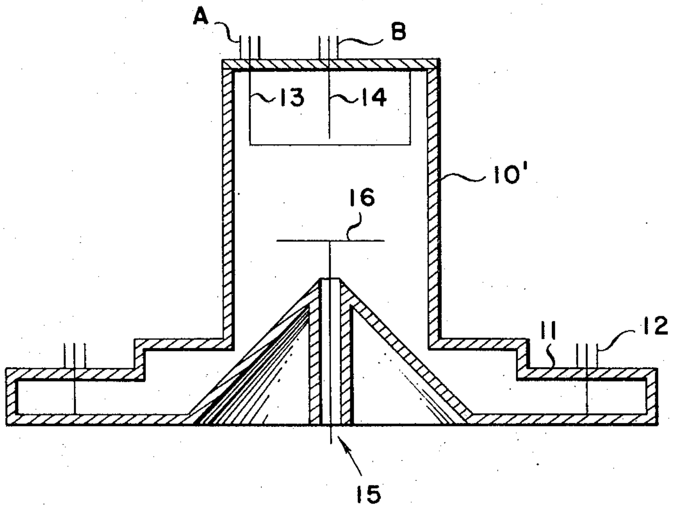
FIG. 7 is a cross section of FIG. 6 taken on the line 7—7.

The distribution network or scanner is shown in FIGS. 4 and 5, and consists of a coaxial section 10 and a radial section 11. $TE_{11}$ inputs to the coaxial section are by means of the coaxial probes A and B. The TEM input is coupled to the scanner by means of the coaxial probe 2. The height of the radial section is stepped to provide improved impedance matched to the phased array. Coupling probes 12 are arranged in a circle on the radial section; these probes couple the signal to the radiators in the phased array. The central area of the radial section is cone shaped to match the coaxial section to the radial guide. An alternate scanner is shown in FIGS. 6 and 7. The $TE_{11}$ inputs A and B to a circular section 10' are connected to coupling loops 13 and 14, while the TEM input is connected to the coaxial probe 15 which terminates in the impedance matching disc 16. The loops 13 and 14 consist of a U-shaped extension of the inner conductors of the input ports. The inner conductors form loops in two crossed planes, each of which is perpendicular to the plane forming the top of the circular section. Otherwise, this embodiment is similar to that in FIGS. 4 and 5.

The couplings to ports A–B and 2–15 are conventional arrangements for exciting the $TE_{11}$ and TEM modes in a cavity. (G. L. Ragan, "Microwave Transmission Circuits," McGraw-hill, 1948; Sarbacher and Edson, "Hyper and Ultra-High Frequency Engineering," Wiley and Sons, 1943, Chapter 8.8).

Figure 3:
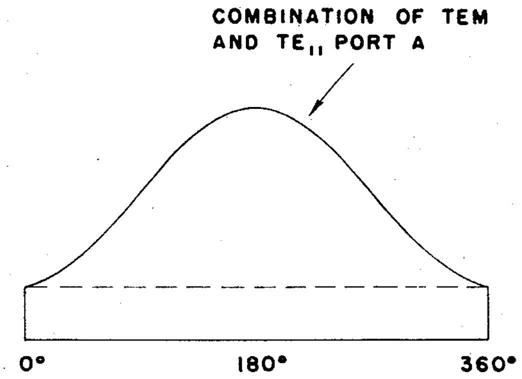

Thus, the coupler 1 accepts an rf directional signal and divides it into two resultant signal paths: $TE_{11}$ and TEM. The resulting sine and cosine outputs of the directional coupler 5 are applied to the $TE_{11}$ ports to produce identical amplitude distributions displaced by 90° in space. The amplitude distributions appearing at the circle of probes on the radial guide are shown in FIG. 2. The properly scaled combination of $TE_{11}$ ports and the TEM port produces the amplitude distribution shown in FIG. 3. This is the so-called "cosine-on-a-pedestal" distribution that is used to provide the aperture illumination for low side lobes in the directional beam. The orientation of the distribution is controlled by varying the relative amplitude of the $TE_{11}$ ports in the same way that the sine and cosine inputs to a synchro resolver rotate the resultant magnetic fields. Thus, the amplitude distribution is rotated as the beam is stepped in azimuth.

In a typical case, the scanner may have 56 probes and is used to feed 224 segments of a cylindrical phased array. The 56 probes are coupled to the feeds of the array by means of suitable electronic switching. By synchronizing the rotation with the quadrant switch selection, the beam is rapidly switched around the array. In other words, the 360° circumference of the scanner illuminates a 90° sector at the feeds. For example, there would be 56 quadrant switches corresponding to the 56 probes and arranged in a circle around the scanner. Each output of the scanner is connected to a four-way electronic switch which can connect the output to any one of four feeds spaced 90° apart at the feed ring. By proper selection of the switches, any consecutive sector of 56 feeds can be activated. A given feed is always connected to the same output port on the scanner, as the beam is stepped in order to maintain a constant amplitude distribution relative to the center of the azimuth sector. This alternation consists of a shift of the amplitude distribution at the scanner. The required amplitude shift is provided by controlling the phase shifters in the control network. Thus, switch 1 can be connected to feeds 1, 57, 113 or 169; switch 2 can be connected to feeds 2, 58, 114, or 170; switch 3 to feeds 3, 59, 115, or 171, etc. Thus, for say, beam position 1, quadrant switches 1–56 are connected to feeds 1–56. For beam position 2, switches 2–56 are connected to feeds 2–56, while switch 1 is now connected to feed 57. For beam position 3, switches 3–56 are connected to feeds 3–56, and switches 1 and 2 are connected to feeds 57 and 58, respectively.

An important feature of the invention is that a monopulse mode is provided at the port 8 of coupler 4 in FIG. 1. As is well known, this is a single cycle of a sine function and aligned with the cosine-on-a-pedestal distribution. This allows a determination of the direction of arrival of a signal by comparing the principal and monopulse outputs of the antenna. (The monopulse output is zero for a target located in line with the center of the active sector; that is, the null of the sine is centered on the peak of the cosine-on-a-pedestal.) The phase of the monopulse output indicates the direction of the target (right or left) while the magnitude indicates how far the target is from a radial direction centered on the active sector. See "Radar System Analysis" by D. K. Barton, published by Prentice-Hall, and others referenced therein.

What is claimed is:

1. A power distribution and control network comprising an rf directional input, means for dividing the rf input into a TEM path and a $TE_{11}$ path, means for adjusting the phase and amplitude in the $TE_{11}$ path to provide two outputs, the amplitudes of which are proportional to the sine and cosine functions, a power scanner consisting of a first section to which the two outputs are connected, a radial section attached to the first section, and including means in the center thereof to which the TEM path is connected, and plurality of outputs on the radial section and evenly spaced around the center thereof.

2. The network as defined by claim 1, wherein the first section is a coaxial section, having a pair of inputs spaced 90° apart for coupling the $TE_{11}$ outputs into the side of the coaxial section.

3. The network as defined by claim 2 and wherein the radial section is stepped at the junction with the coaxial section.

4. The network as defined by claim 1 and wherein the means for dividing the rf input is a directional coupler.

5. The network as defined by claim 4 and wherein the means for adjusting the phase and amplitude of the $TE_{11}$ path comprises a first directional coupler, a pair of equal and opposite phase shifters connected to the outputs of the coupler and a second directional coupler connected to the outputs of the phase shifters.

* * * * *